UNITED STATES PATENT OFFICE.

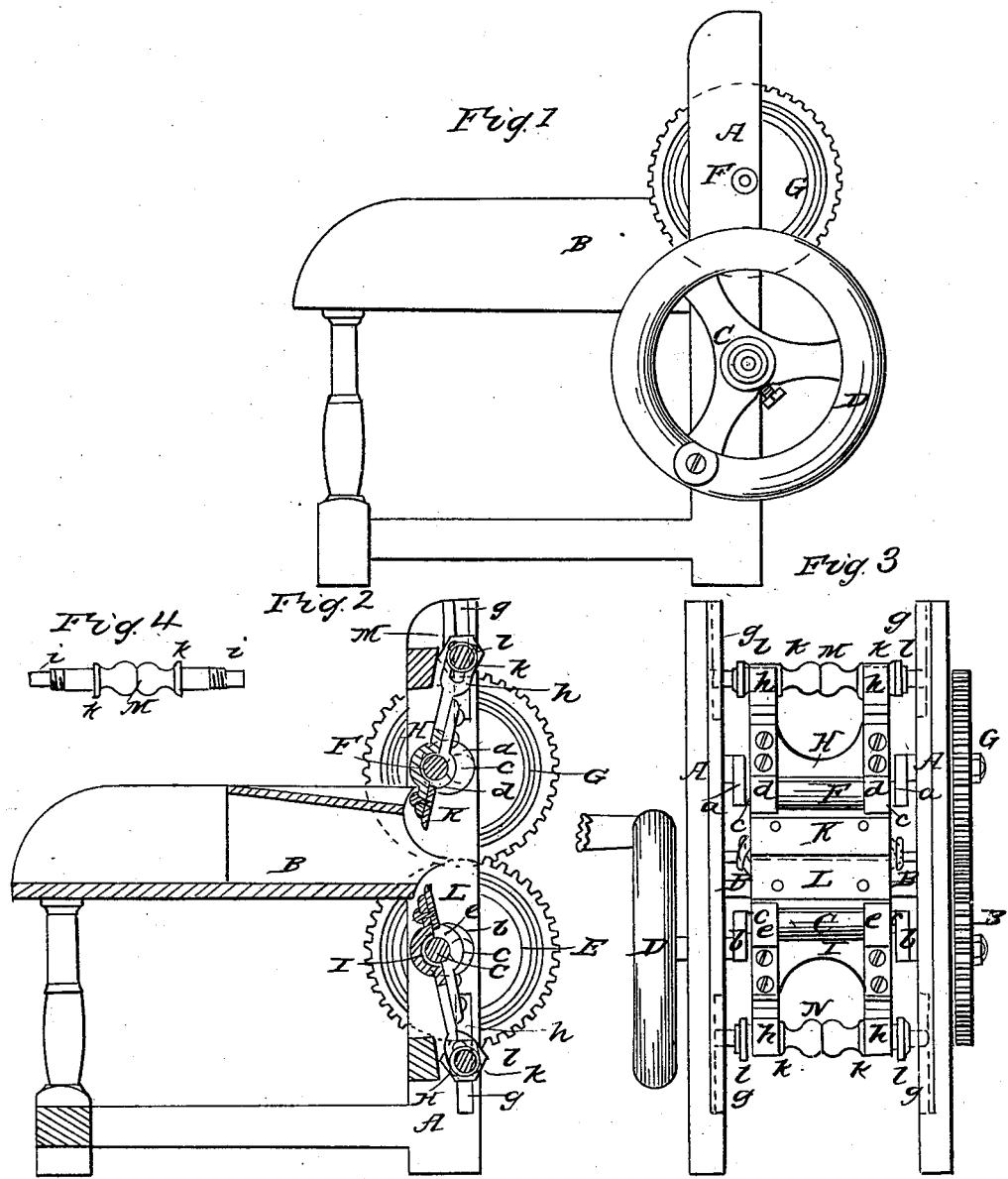

AURY G. COES, OF WORCESTER, MASSACHUSETTS.

STRAW-CUTTER.

Specification of Letters Patent No. 18,084, dated September 1, 1857.

*To all whom it may concern:*

Be it known that I, AURY G. COES, of Worcester, in the county of Worcester and State of Massachusetts, have invented an Improved Machine for Cutting Hay, Straw, or Fodder for Animals; and I do hereby declare that the same is fully described and represented in the following specification and the accompanying drawings, of which—

Figure 1 is a side elevation of such machine. Fig. 2 a vertical, central and longitudinal section of it. Fig. 3, a front end elevation.

In the drawings, A denotes the frame of the machine, B the trough on which the straw is laid preparatory to being cut; C, is a bell cranked driving shaft, having a fly wheel D, and a gear E, affixed on its opposite ends, the said shaft being disposed in the frame and below the trough as shown in the drawings, above the trough and in the frame and over and parallel with the shaft, C, is another bell cranked shaft F which has a gear G, fixed on one end and made to match into the gear E, in order that when the driving shaft is put in revolution it may impart corresponding rotary motions to the other shaft. The bell cranks of the above shafts are shown at $a$, $a$, and $b$, $b$, their journals or wrists $c$, $c$, being made to revolve respectively in boxes $d$, $d$, or $e$, $e$, applied to two broad boxes H, I, the former of which carries a cutting knife K, while the latter supports a bed L. The form of the knife as well as that of the bed is given in the drawings, each being fastened to its lever by screws or other proper means.

Each lever carries a fulcrum bar or rod M, or N, one of which is arranged above one crank, while the other is disposed below the other crank and the ends of each rod enter vertical guides or slots, made in metallic plates or bars $g$, $g$, applied to the posts of the frame A, and arranged as shown in Figs. 2 and 3. Besides the said slots, each fulcrum rod passes through forks which are made in the tail or longer arm of its lever, such forks being shown at $h$, $h$, in Figs. 2 and 3, and formed as shown in Fig. 2. Screws $i$, $i$, and shoulders $k$, $k$, are made on each rod as shown in Fig. 4, which exhibits a separate side view of the rod. A clamp nut $l$, is used on each screw. By these contrivances, the distance of the rod from the wrist of the crank of its lever may be more or less adjusted and determined as occasion may require in order to alter the degree of feed motion of the knife and bed, the upward and downward movements of each remaining the same, while they are in operation.

When the shaft is put in rotation, there will be imparted to the bed as well as to the knife a compound motion of a peculiar character as hereinafter described, so that they will be made not only to approach and recede from each other but move laterally in a manner such as will cause them to feed forward and cut through any hay or straw which may be projected from the trough and so as to enter between them, while they are in motion.

I do not claim, a rotary cutter cylinder and a roller for the cutter to work against and feed and cut straw; nor do I claim feeding and cutting straw by the action of one or more knives on a reciprocating bed; nor do I claim so applying the knife to a crank and a radial arm or pitman, that by means of the two, when the crank is in revolution, the knife will have a compound motion composed of two circular motions, one tending to move the knife up and down and the other to impart to it lateral motions to and fro, such compound motion of the knife being like that described in the specification of Loren J. Wicks' patent, dated November 13th, 1855, the knife in this latter case being made to operate and cut against a roller; nor do I claim, a rotary knife or cutter and a reciprocating bed as shown in the patent of Thomas C. Simondton and Loren J. Wicks, dated April 10th A. D. 1855; nor do I claim rotating knives and beds in separate circular paths as shown in the patent of Lyman Clinton dated July 10th 1855. My invention or improvement differs essentially from all of these last mentioned, as I impart a compound motion to the knife as well as to the bed and produce such compound motion by means of a lever, whose fulcrum has a motion in a straight line, while the lever is being moved with a reciprocating lateral motion by the rotary motion of a crank which also produces the upward and downward motions of the bed or the knife according to whichever it may be connected.

My machine operates to better advantage than the others to which I have referred, because, while its knife and bed mutually operate to grasp the straw, the former is made to cut through it in nearly a vertical plane. Besides, the peculiar mode of operating the bed and knife enables them to be easily adjusted so as to vary the feed of the straw. Furthermore, the substance to be cut is seized to better advantage than it is by a knife and bed revolving toward each other in circular paths only. Again, the straw is not so liable to be thrown too far forward by centrifugal action as is the case when the bed and cutter revolve in circular paths.

What I claim is—

My improved straw cutting machine as constructed so that its bed and knife shall each operate with a compound motion produced by a lever crank, fulcrum rod and guides arranged so as to operate together substantially as specified.

In testimony whereof I have hereunto set my signature.

AURY G. COES.

Witnesses:
WILLIAM S. DAVIS,
F. WAYLAND, Jr.